United States Patent
Chen et al.

(10) Patent No.: US 9,086,576 B2
(45) Date of Patent: Jul. 21, 2015

(54) STEREO DISPLAY AND IMAGE DISPLAY METHOD THEREOF

(71) Applicant: Au Optronics Corporation, Hsinchu (TW)

(72) Inventors: Chao-Yuan Chen, Hsinchu County (TW); Yu-Chieh Chen, New Taipei City (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 14/329,992

(22) Filed: Jul. 14, 2014

(65) Prior Publication Data
US 2014/0320774 A1    Oct. 30, 2014

Related U.S. Application Data

(62) Division of application No. 13/105,898, filed on May 12, 2011, now Pat. No. 8,823,889.

(30) Foreign Application Priority Data

Sep. 27, 2010  (TW) .............................. 99132638 A

(51) Int. Cl.
G02F 1/1335  (2006.01)
G02B 27/26   (2006.01)
G02F 1/1347  (2006.01)
G02B 27/22   (2006.01)

(52) U.S. Cl.
CPC ............ *G02B 27/26* (2013.01); *G02B 27/2214* (2013.01); *G02F 1/13471* (2013.01); *G02F 1/133526* (2013.01); *G02F 1/133528* (2013.01)

(58) Field of Classification Search
None
See application file for complete search history.

(56) References Cited

U.S. PATENT DOCUMENTS

| | | | |
|---|---|---|---|
| 5,396,406 A * | 3/1995 | Ketchpel | 362/27 |
| 6,369,868 B1 * | 4/2002 | Fan et al. | 349/88 |
| 7,215,475 B2 * | 5/2007 | Woodgate et al. | 359/624 |
| 8,149,342 B2 * | 4/2012 | Ijzerman et al. | 349/15 |
| 2003/0164906 A1 * | 9/2003 | Arakawa et al. | 349/96 |
| 2006/0215103 A1 * | 9/2006 | Miyashita et al. | 349/153 |
| 2008/0316380 A1 * | 12/2008 | Ijzerman et al. | 349/15 |
| 2010/0026920 A1 * | 2/2010 | Kim et al. | 349/15 |
| 2010/0271684 A1 * | 10/2010 | Woodgate et al. | 359/256 |

* cited by examiner

*Primary Examiner* — Richard Kim
*Assistant Examiner* — Ryan Crockett
(74) *Attorney, Agent, or Firm* — Jianq Chyun IP Office

(57) ABSTRACT

A stereo display includes a display panel, a first polarizer modulator disposed above the display panel, and a second polarizer modulator disposed above the first polarizer modulator. The second polarizer modulator includes a first lens set, a second lens set opposite to the first lens set, a polarization material, and a birefringent material. An angle between an extending direction of the first lens set and an extending direction of the second lens set is not 0 or 180 degrees. The polarization material is between the first lens set and the second lens set. The birefringent material is disposed in at least one of the first lens set and the second lens set.

17 Claims, 10 Drawing Sheets

US 9,086,576 B2

STEREO DISPLAY AND IMAGE DISPLAY METHOD THEREOF

CROSS-REFERENCE TO RELATED APPLICATION

This application is a divisional of and claims priority benefit of U.S. patent application Ser. No. 13/105,898, filed on May 12, 2011, now pending, which claims the priority benefit of Taiwan application serial no. 99132638, filed Sep. 27, 2010. The entirety of the above-mentioned patent application is hereby incorporated by reference herein and made a part of this specification.

BACKGROUND OF THE INVENTION

1. Field of the Invention

The disclosure is related to a stereo display and to an operating method thereof, and in particular to a stereo display which is capable of providing a 2D display mode, a 3D portrait display mode, and a 3D landscape display mode and to an image display method thereof.

2. Description of Related Art

Currently, stereo display technologies may be generally classified as auto-stereoscopic, in which the viewer views with the naked eye, or as stereoscopic, in which glasses of specific designs must be worn for viewing. The operating principle of auto-stereoscopic display is that a fixed optical grating is used to control images viewed by the left eye and right eye of the viewer. According to visual characteristics of the human eye, when the left and right eyes respectively view two images which have the same image content but different parallax, the human eye interprets the two overlapping images as a stereo image. The operating principle of stereoscopic display is that a display displays images for the left and right eyes; the images are selected by stereoscopic glasses to be respectively viewed by the left and right eyes, so as to generate stereo vision.

In addition, many current displays are able to provide a portrait display mode and a landscape display mode. However, the above displays which are able to provide the portrait display mode and the landscape display mode are limited to 2D display mode displays. Currently, no stereo display is able to provide a 3D portrait display mode and a 3D landscape display mode at the same time.

SUMMARY OF THE INVENTION

The disclosure provides a stereo display and an operating method thereof which are capable of providing a 2D display mode, a 3D portrait display mode, and a 3D landscape display mode.

The disclosure provides a stereo display which includes a display panel, a first polarizer modulator, and a second polarizer modulator. The first polarizer modulator is disposed above the display panel. The second polarizer modulator is disposed above the first polarizer modulator and includes a first lens set, a second lens set, a polarization material, and a first birefringent material. The first lens set and the second lens set are opposite to each other, and an angle which is not 0 or 180 degrees is included between an extending direction of the first lens set and an extending direction of the second lens set. The polarization material is disposed between the first lens set and the second lens set. The first birefringent material is filled in the first lens set.

The disclosure provides an image display method for a stereo display. The method includes providing a stereo display described above and letting a light beam which is from the display panel and has a first polarizing direction sequentially pass through the first polarizer modulator and the second polarizer modulator, so as to display an image.

The disclosure provides an image display method for a stereo display. The method includes providing the stereo display described above. When a 2D image is to be displayed, a light beam emitted by the display panel and having a first polarizing direction is rotated into a light beam having a second polarizing direction after passing through the first polarizer modulator, and the light beam having the second polarizing direction retains the second polarizing direction after passing through the second polarizer modulator, wherein the light beam having the second polarizing direction is not substantially refracted when passing through the birefringent material of the second polarizer modulator, so as to display the 2D image. When an image in a 3D portrait display mode is to be displayed, the light beam emitted by the display panel and having the first polarizing direction is rotated into the light beam having the second polarizing direction after passing through the first polarizer modulator, and the light beam having the second polarizing direction is rotated into the light beam having the first polarizing direction after passing through the second polarizer modulator, wherein the light beam having the first polarizing direction is refracted when passing through the birefringent material of the second polarizer modulator, so as to display the image in the 3D portrait display mode. When an image in a 3D landscape display mode is to be displayed, the light beam emitted by the display panel and having the first polarizing direction substantially retains the first polarizing direction after passing through the first polarizer modulator, and the light beam having the first polarizing direction is rotated into the light beam having the second polarizing direction after passing through the second polarizer modulator, wherein the light beam having the second polarizing direction is refracted when passing through the birefringent material of the second polarizer modulator, so as to display the image in the 3D landscape display mode.

In summary, the stereo display according to the disclosure utilizes the first polarizer modulator and the second polarizer modulator in conjunction, and the birefringent material is disposed in the lens set of the second polarizer modulator. Through the above arrangement, the display is capable of providing one of the 2D display mode, the 3D portrait display mode, and the 3D landscape display mode.

In order to make the aforementioned and other objects, features and advantages of the disclosure comprehensible, embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

First Embodiment

Figure 1:
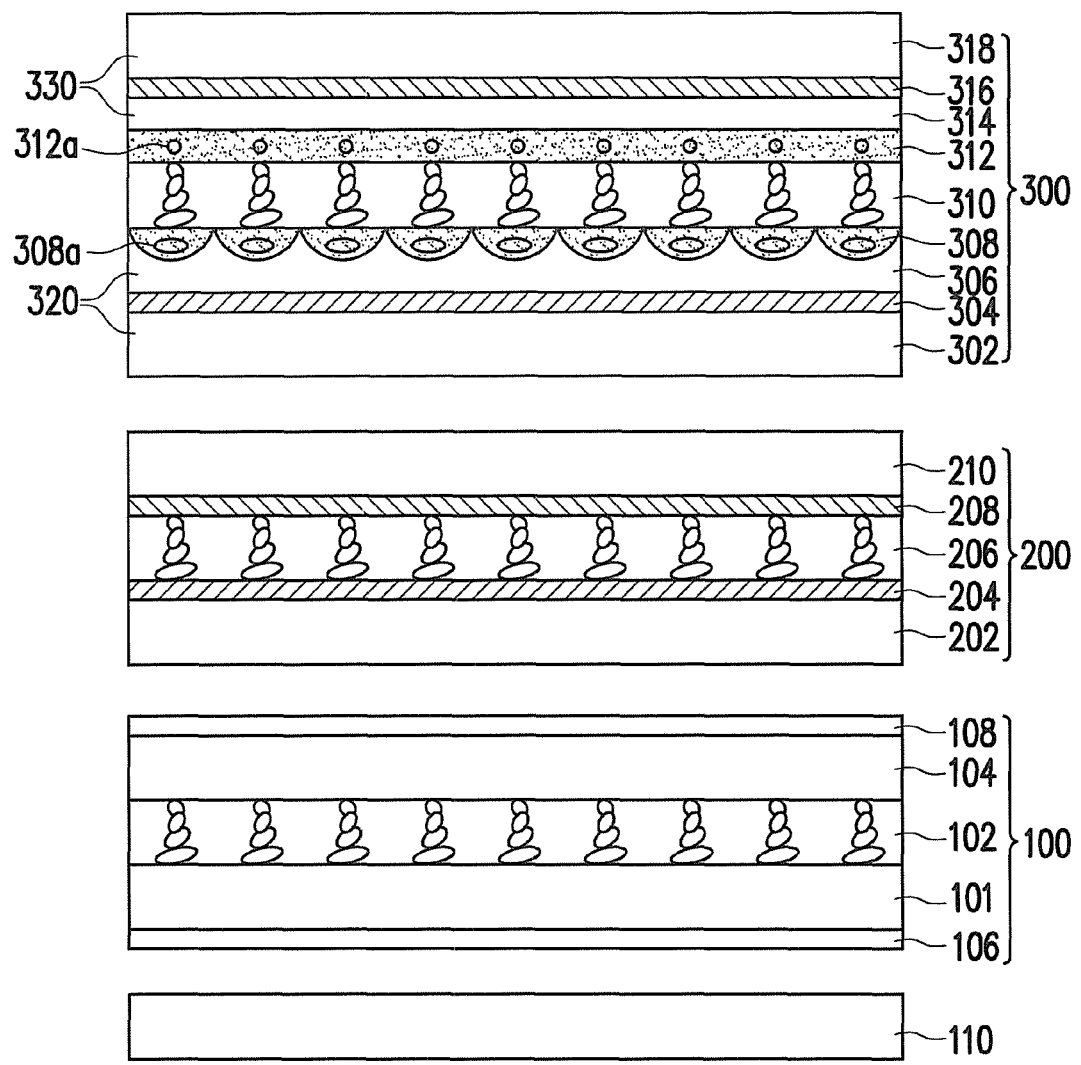
FIG. 1 is a schematic cross-sectional view of a stereo display according to an embodiment of the disclosure.

FIG. 1 is a schematic cross-sectional view of a stereo display according to an embodiment of the disclosure. Referring to FIG. 1, the stereo display according to the present embodiment includes a display panel 100, a first polarizer modulator 200, and a second polarizer modulator 300.

The display panel 100 includes a pixel array substrate 101, an opposite substrate 104, and a display medium 102. The pixel array substrate 101 includes a plurality of scan lines (not shown), a plurality of data lines (not shown), and a plurality of pixels structures (not shown). Each of the pixel structures has an active device (not shown) and a pixel electrode (not shown). The active device may be a bottom gate type thin film transistor (TFT) or a top gate type TFT and includes a gate, a channel, a source, and a drain. The gate is electrically connected to the scan line. The source is electrically connected to the data line. The channel is between the source and the drain. The opposite substrate 104 is opposite to the pixel array substrate 101. The opposite substrate 104 may be a blank substrate or a substrate which has an electrode layer (not shown) disposed thereon. In addition, a color filter array (not shown) and a shielding pattern layer (not shown) may be further disposed on the opposite substrate 104. The display medium 102 is disposed between the pixel array substrate 101 and the opposite substrate 104. The display medium 102 may include liquid crystal molecules, an electrophoretic display medium, or another suitable medium.

According to the present embodiment, the display panel 100 may further include at least one polarizer 106 and 108 respectively disposed on a surface of the pixel array substrate 100 and a surface of the opposite substrate 108. In addition, a backlight module 110 is further included on a back side of the display panel 100, so as to provide light to the display panel 100.

The first polarizer modulator 200 is disposed above the display panel 100. According to the present embodiment, the first polarizer modulator 200 includes a first substrate 202, a second substrate 210 opposite to the first substrate, and a polarization material layer 206 between the first substrate 202 and the second substrate 210. The first substrate 202 and the second substrate 210 may be transparent rigid substrates or transparent flexible substrates. The polarization material layer 206 may comprises a liquid crystal material (such as twisted liquid crystal material, vertical alignment liquid crystal material or other type liquid crystal material) or other birefringence material, which can be controlled/modified by external field (like electric/magnetic field), for providing essential retardation for rotate the polarization of the light. In addition, at least one of a first electrode 204 and a second 206 is disposed on the first substrate 202 or/and the second substrate 210. In the embodiment, the first electrode 204 is disposed on the first substrate 202 and the second electrode 208 is disposed on the second substrate 210 for illustration, but it does not limit thereto.

According to an embodiment, both the first electrode 204 and the second electrode 208 are unpatterned electrode layers. In other words, according to the present embodiment, when voltages are applied to the first electrode 204 and the second electrode 208, twisting of the liquid crystal layer 206 is controlled in a full-scale manner.

According to another embodiment, the first electrode 204 has a first electrode pattern, and the second electrode 208 has a second electrode pattern. The first electrode pattern of the first electrode 204 and the second electrode pattern of the second electrode 208 may each be a striped pattern and may cross over each other, so that the first polarizer modulator 200 forms a passive liquid crystal cell. The first polarizer modulator 200 may also be designed as an active liquid crystal cell, meaning that the first electrode 204 or the second electrode 208 is designed as an electrode layer which has active devices. If the first polarizer modulator 200 is a passive liquid crystal cell or an active liquid crystal cell, the polarization material layer 206 (such as liquid crystal material) in a partial region of the first polarizer modulator 200 is controllable. Therefore, the display according to the present embodiment is capable of partially displaying 3D images.

Moreover, the second polarizer modulator 300 is disposed above the first polarizer modulator 200. The second polarizer modulator 300 includes a first lens set 320, a second lens set 330, a lower electrode 304, an upper electrode 316, a polarization material 310, and birefringent materials 308 and 312. According to the embodiments of the disclosure, the birefringent materials 308 and 312 include, for example, liquid crystal materials or other birefringence material, which can be controlled/modified by external field (like electric/magnetic field), for providing essential retardation for rotate the polarization of the light. However, the disclosure is not limited to this configuration; other suitable materials may also be used. The polarization material 310 includes, for example, liquid crystal materials (such as twisted liquid crystal material, vertical alignment liquid crystal material or other type liquid crystal material) or other birefringence material, which can be controlled/modified by external field (like electric/magnetic field), for providing essential retardation for rotate the polarization of the light.

Figure 2:
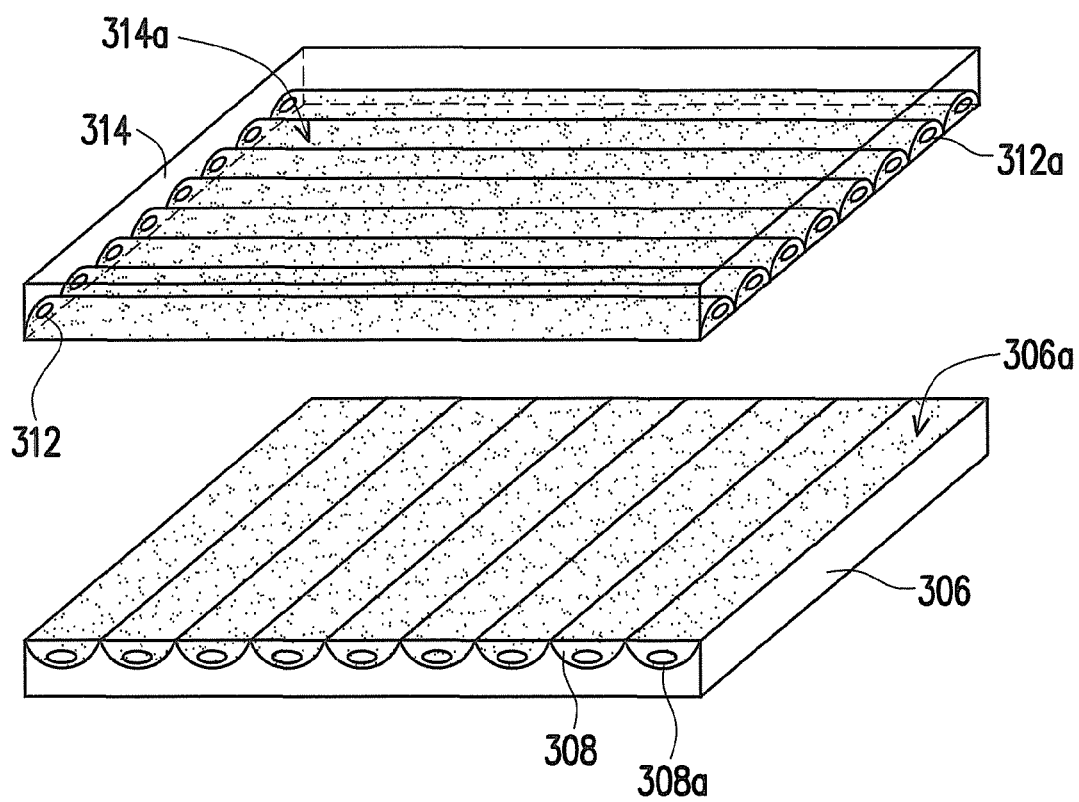
FIG. 2 is a schematic perspective view of a first lens set and a second lens set in FIG. 1.

According to an embodiment of the disclosure, the first lens set 320 is formed by a first supporting substrate 302 and a first lens structure 306 disposed on the first supporting substrate 302. The second lens set 330 is formed by a second supporting substrate 318 and a second lens structure 314 disposed on the second supporting substrate 318. The first lens structure 306 and the second lens structure 314 are, for example, formed by resin having groove structures 306a and 314a. The resin is, for example, ultraviolet light-curing resin, thermal curing resin, or another suitable type of resin. In addition, each of the first lens structure 306 and the second lens structure 314 includes a plurality of columnar lens structures. The plurality of columnar lens structures are the plurality of columnar groove structures 306a and 314a formed in the resin. In particular, the first lens set 320 and the second lens set 330 are disposed opposite to each other, and an angle between an extending direction of the first lens structure 306 of the first lens set 320 and an extending direction of the second lens structure 314 of the second lens set 330 is not 180 degrees, as shown in FIG. 2. In other words, the extension direction of the columnar lens structures 306 (columnar groove structures 306a) and the extension direction of the columnar lens structures 314 (columnar groove structures 314a) are different.

Furthermore, the birefringent materials 308 and 312 are filled in the first lens structure 306 (columnar groove structures 306a) of the first lens set 320 and in the second lens structure 314 (columnar groove structures 314a) of the second lens set 330. Polymer molecules 308a in the birefringent material 308 are filled in the first lens structure 306 (columnar groove structures 306a) of the first lens set 320 in a fixed arrangement, and polymer molecules 312a in the birefringent material 312 are filled in the second lens structure 314 (columnar groove structures 314a) of the second lens set 330 in a fixed arrangement. According to the present embodiment, the polymer molecules 308a in the birefringent material 308 lie horizontally in the first lens structure 306. Similarly, the polymer molecules 312a in the birefringent material 312 lie horizontally in the second lens structure 314. Hence, the birefringent materials 308 and 312 have specific alignment directions (such as an alignment direction of the X direction). According to the embodiments of the disclosure, the polymer molecules 308a and 312a include, for example, liquid crystal polymer molecules or other birefringence material, which can be controlled/modified by external field (like electric/magnetic field), for providing essential retardation for rotate the polarization of the light. However, the disclosure is not limited to this configuration; other suitable materials may also be used.

It should be noted that according to the present embodiment, the polymer molecules 308a and 312a in the birefringent materials 308 and 312 have a first axial refractive index (no) and a second axial refractive index (ne). The first axial refractive index (no) may be called a short axial refractive index of the liquid crystal molecules, and the second axial refractive index (ne) may be called a long axial refractive index of the liquid crystal molecules. A refractive index of the first lens structure 306 (refractive index of the resin) is equal to the first axial refractive index (no) of the polymer molecules 308a of the birefringent material 308, and a refractive index of the second lens structure 314 (refractive index of the resin) is equal to the first axial refractive index (no) of the polymer molecules 312a of the birefringent material 312.

Moreover, in the second polarizer modulator 300, the lower electrode 304 may be disposed on a surface of the first lens set 320, and the upper electrode 316 is disposed on a surface of the second lens set 330. According to the present embodiment, the lower electrode 304 is disposed between the first supporting substrate 302 and the first lens structure 306, and the upper electrode 316 is disposed between the second supporting substrate 318 and the second lens structure 314.

Similarly, according to an embodiment, both the upper electrode 316 and the lower electrode 304 are unpatterned electrode layers. In other words, according to the present embodiment, when voltages are applied to the upper electrode 316 and the lower electrode 304, the polarization material 310 is controlled in a full-scale manner.

According to another embodiment, the lower electrode 304 has a lower electrode pattern, and the upper electrode 316 has an upper electrode pattern. The lower electrode pattern of the lower electrode 304 and the upper electrode pattern of the upper electrode 316 may each be a striped pattern and may cross over each other, so that the second polarizer modulator 300 forms a passive liquid crystal cell. The second polarizer modulator 300 may also designed as an active liquid crystal cell, meaning that the lower electrode 304 or the upper electrode 316 is designed as an electrode layer which has an active device. If the second polarizer modulator 300 is a passive liquid crystal cell or an active liquid crystal cell, the polarization material 310 in the second polarizer modulator 300 is controllable. Therefore, the display according to the present embodiment is capable of partially displaying 3D images.

It is noted that in the second polarizer modulator 300 has the upper electrode 316 and the lower electrode 304 for clearly description. However, in another embodiment, the second polarizer modulator 300 may merely has the upper electrode 316 or the lower electrode 304 to control the polarization material 310.

An image display method of the stereo display according to the disclosure includes providing one of the stereo displays according to the embodiments of the disclosure, and letting a light beam which is from the display panel and has a first polarizing direction sequentially pass through the first polarizer modulator and the second polarizer modulator, so as to display an image, wherein the image is a 2D image, a 3D portrait display mode image, or a 3D landscape display mode image. The following describes the image display method of the stereo display in FIG. 1. In order to describe the image display method of the stereo display, the polarization materials in the first polarizer modulator and the second polarizer modulator are twisted liquid crystal materials for example. However, it does not limit thereto.

2D Display Mode

Figure 3A:
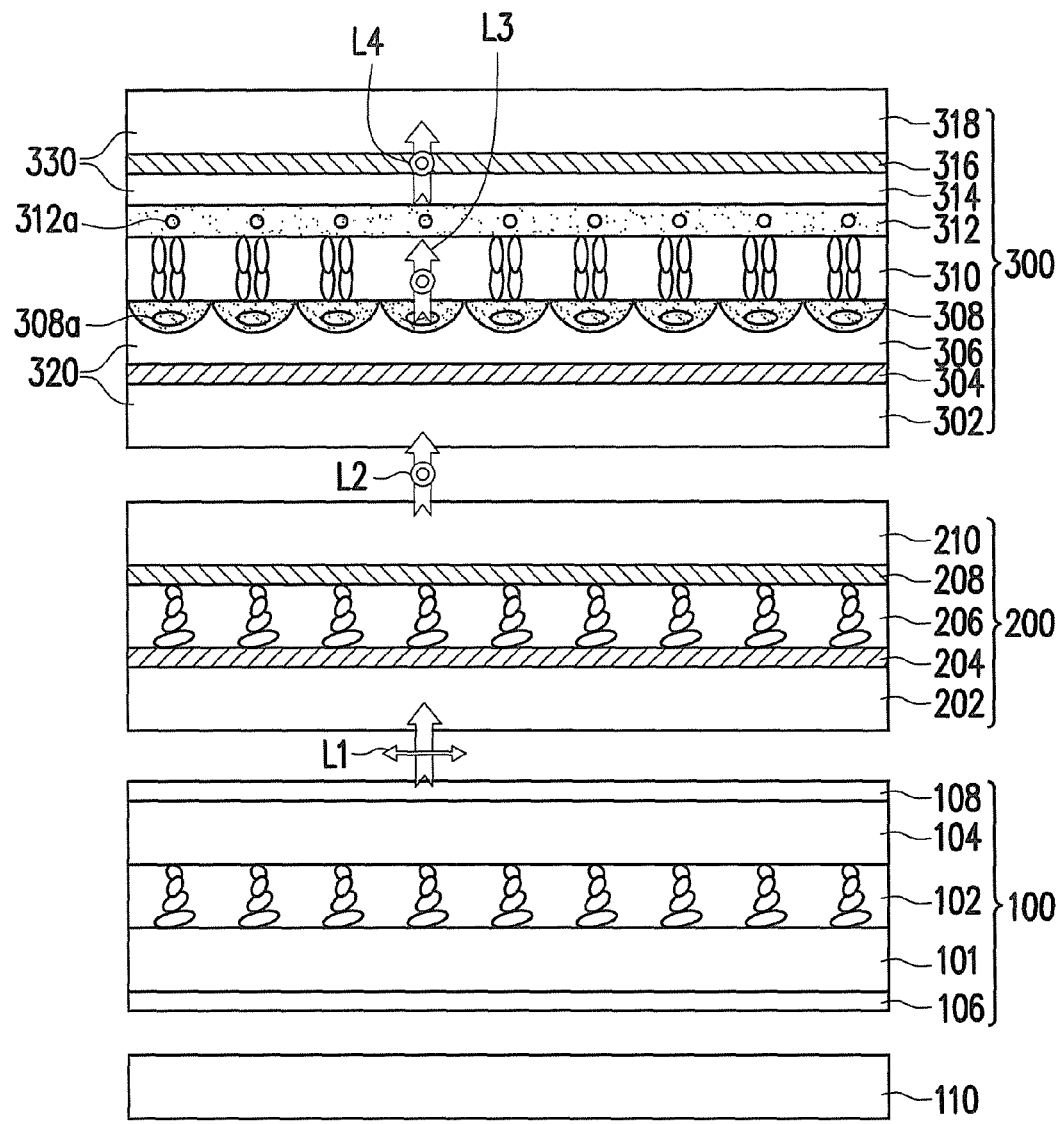
FIG. 3A is a schematic view of the stereo display in FIG. 1 in a 2D display mode.

FIG. 3A is a schematic view of the stereo display in FIG. 1 in a 2D display mode. Please refer to FIG. 3A. When a 2D image is to be displayed by the display, no voltage is applied to the first polarizer modulator 200, so that the liquid crystal layer 206 is maintained in a twisted arrangement state, and a voltage is applied to the second polarizer modulator 300, so that the polarization material 310 is in an non-twisted arrangement state. According to the present embodiment, the liquid crystal layer 206 of the first polarizer modulator 200 and the polarization material 310 of the second polarizer modulator 300 adopts twisted nematic liquid crystal molecules, and an operating voltage thereof may be 3.3 V or 5 V. However, the types of the liquid crystal layer 206 of the first polarizer modulator 200 and the polarization material 310 of the second liquid crystal and the value of the operating voltage thereof are not limited in this disclosure. According to another embodiment, another type of liquid crystal material may be adopted and another suitable operating voltage may be utilized.

First, the display panel 100 emits a light beam L1 which has a first polarizing direction. In other words, after the light emitted by the backlight module 110 is polarized and twisted by the polarizers 106 and 108 of the display panel 100 and by the display medium 102, the emitted light beam L1 has a first polarizing direction (such as a polarizing direction parallel to the X direction).

Since the liquid crystal layer 206 in the first polarizer modulator 200 is in a twisted arrangement state, the light beam L1 is rotated into a light beam L2 which has a second polarizing direction (such as a polarizing direction parallel to the Y direction) after passing through the first polarizer modulator 200.

Since the polarization material 310 in the second polarizer modulator 300 is in an non-twisted arrangement state, the light beam L2 which has the second polarizing direction still retains the second polarizing direction after passing through the second polarizer modulator 300.

In particular, the birefringent material 308 has an alignment direction (X direction alignment) of the first direction, and the refractive index of the first lens structure 306 is equivalent to the first axial refractive index (no) of the polymer molecules 308a of the birefringent material 308. Therefore, the light beam L2 which has the second polarizing direction is not refracted when passing through the first lens structure 306 and the birefringent material 308 of the second polarizer modulator 300. In other words, the light beam L2 directly passes through the first lens structure 306 and the birefringent material 308 to become a light beam L3 which has the second polarizing direction.

Since the polarization material 310 in the second polarizer modulator 300 is in an non-twisted arrangement state, the light beam L3 which has the second polarizing direction still retains the second polarizing direction after passing through the polarization material 310.

The birefringent material 312 has the alignment direction (X direction alignment) of the first direction, and the refractive index of the second lens structure 314 is equivalent to the first axial refractive index (no) of the polymer molecules 312a of the birefringent material 312. Therefore, the light beam L3 which has the second polarizing direction is also not refracted when passing through the birefringent material 312 and the second lens structure 314 of the second polarizer modulator 300. In other words, the light beam L3 directly passes through the birefringent material 312 the second lens structure 314 to become a light beam L4 which directly passes through the second polarizer modulator 300.

In the display mode shown in FIG. 3A, since the light beam L4 directly passes through the second polarizer modulator 300 and is not refracted, the image viewed by the viewer is a 2D image.

3D Portrait Display Mode

Figure 3B:
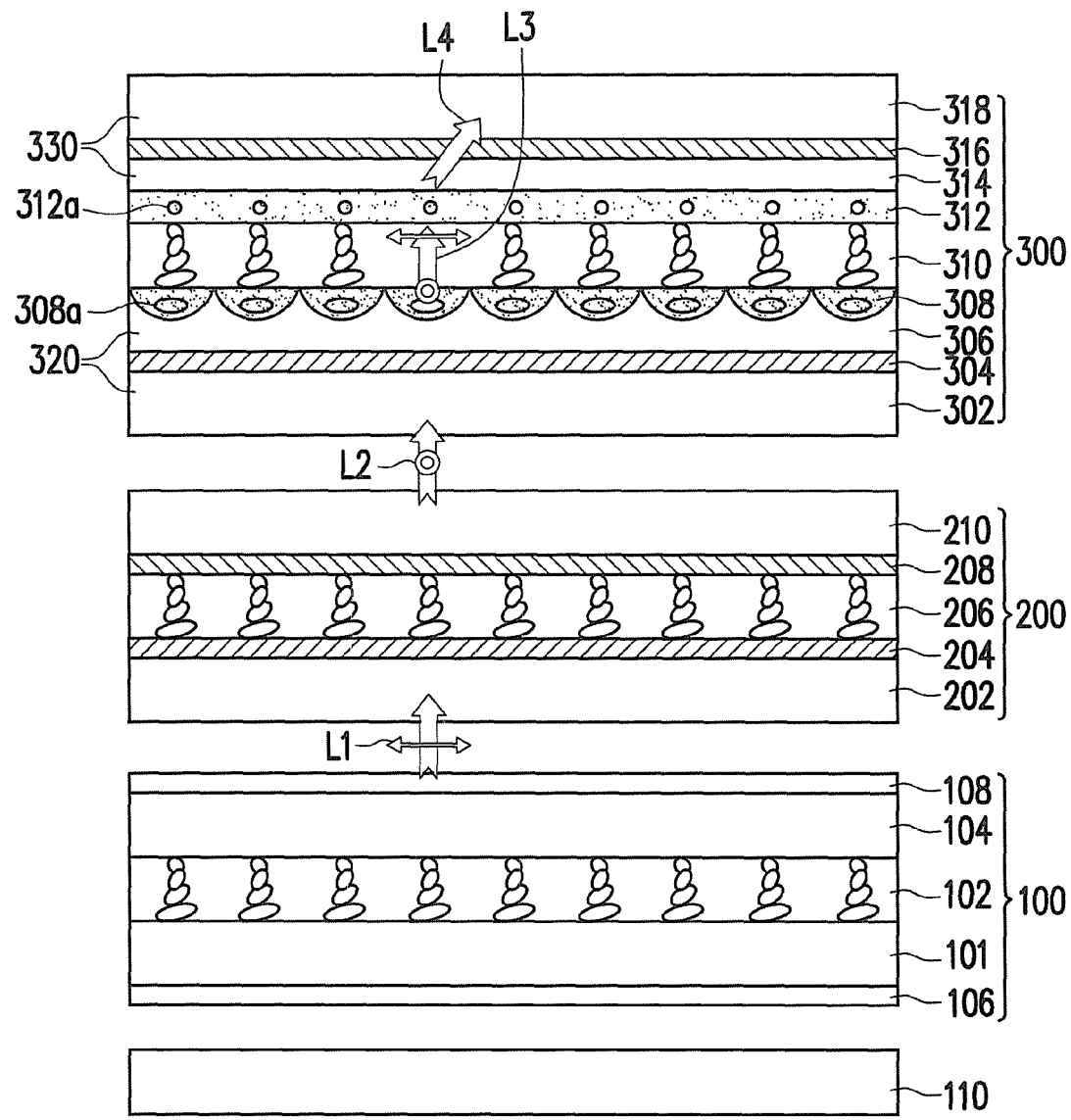
FIG. 3B is a schematic view of the stereo display in FIG. 1 in a 3D portrait display mode.

FIG. 3B is a schematic view of the stereo display in FIG. 1 in a 3D portrait display mode. Please refer to FIG. 3B. When a 3D image is to be displayed by the display in the 3D portrait display mode, no voltage is applied to the first polarizer modulator 200, so that the liquid crystal layer 206 is maintained in a twisted arrangement state, and no voltage is applied to the second polarizer modulator 300, so that the polarization material 310 is maintained in a twisted arrangement state.

Similarly, the display panel 100 emits a light beam L1 which has a first polarizing direction (such as a polarizing direction parallel to the X direction).

Since the liquid crystal layer 206 in the first polarizer modulator 200 is in the twisted arrangement state, the light beam L1 is rotated into a light beam L2 which has a second polarizing direction (such as a polarizing direction parallel to the Y direction) after passing through the first polarizer modulator 200.

Since the polarization material 310 in the second polarizer modulator 300 is in also in the twisted arrangement state, the light beam L2 which has the second polarizing direction is rotated into having the first polarizing direction (such as the polarizing direction parallel to the X direction) after passing through the second polarizer modulator 300.

In particular, the birefringent material 308 has an alignment direction (X direction alignment) of the first direction, and the refractive index of the first lens structure 306 is equivalent to the first axial refractive index (no) of the polymer molecules 308a of the birefringent material 308. Therefore, the light beam L2 which has the second polarizing direction is not refracted when passing through the first lens structure 306 and the birefringent material 308 of the second polarizer modulator 300. In other words, the light beam L2 directly passes through the first lens structure 306 and the birefringent material 308 to become a light beam L3 which has the second polarizing direction.

When the light beam L3 which has the second polarizing direction passes through the polarization material 310, the light beam L3 is rotated into having the first polarizing direction (such as the polarizing direction parallel to the X direction).

Since the birefringent material 312 has the alignment direction (X direction alignment) of the first direction, the light beam L3 which has the first polarizing direction is refracted when passing through the birefringent material 312 and the second lens structure 314 due to the difference between the second axial refractive index (ne) of the polymer molecules 312a of the birefringent material 312 and the refractive index of the second lens structure 314. In other words, after the light beam L3 passes through the birefringent material 312 and the second lens structure 314, the light beam L3 becomes a refracted light beam L4 which passes through the second polarizer modulator 300.

In the display mode shown in FIG. 3B, since the light beam L4 passes through the second polarizer modulator 300 as a refracted light beam, the image viewed by the viewer is a 3D image.

3D Landscape Display Mode

Figure 3C:
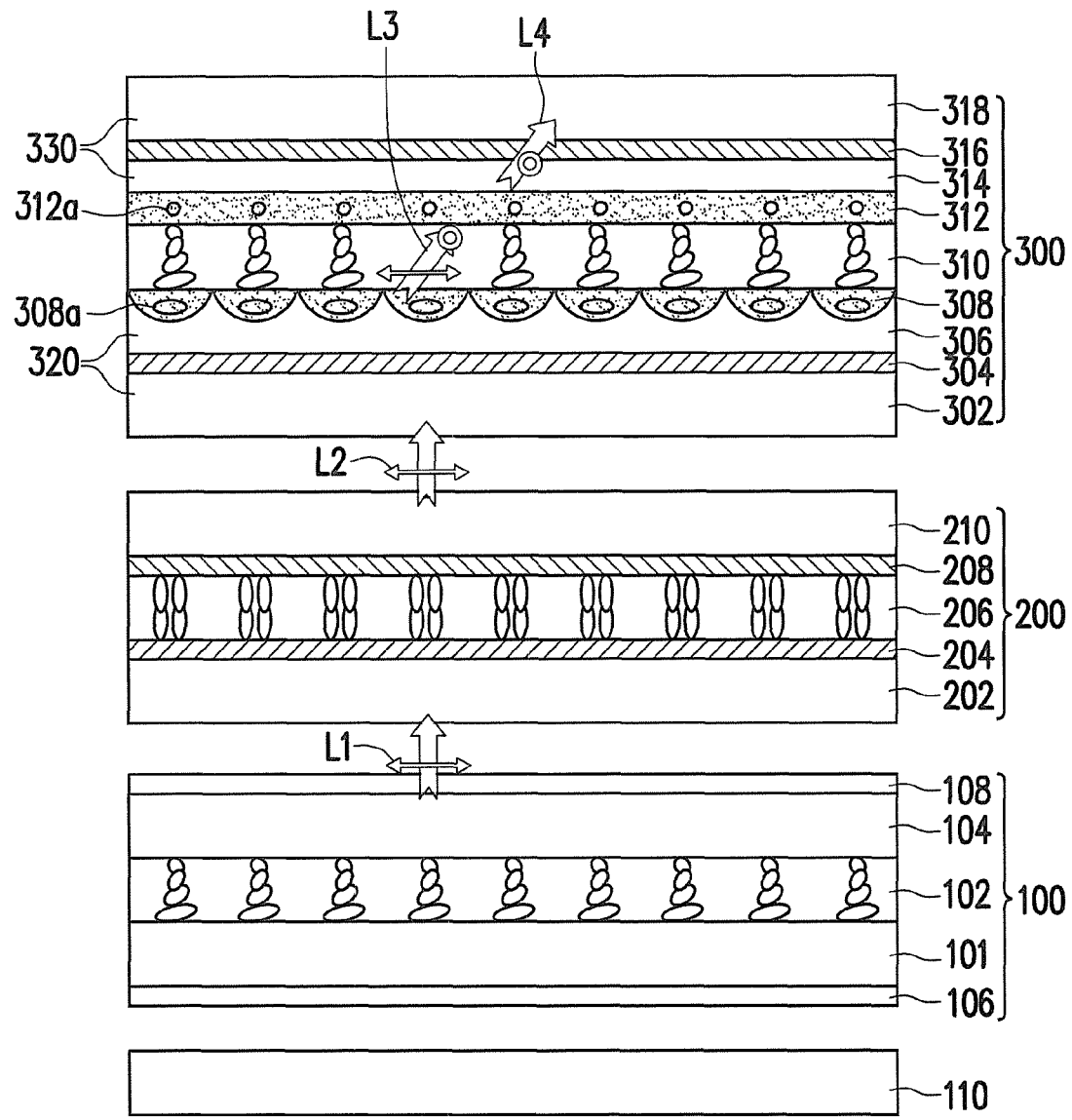
FIG. 3C is a schematic view of the stereo display in FIG. 1 in a 3D landscape display mode.

FIG. 3C is a schematic view of the stereo display in FIG. 1 in a 3D landscape display mode. Please refer to FIG. 3C. When a 3D image is to be displayed by the display in the 3D landscape display mode, a voltage is applied to the first polarizer modulator 200, so that the liquid crystal layer 206 is in an non-twisted arrangement state, and no voltage is applied to the second polarizer modulator 300, so that the polarization material 310 is maintained in a twisted arrangement state.

Similarly, the display panel 100 emits a light beam L1 which has a first polarizing direction (such as a polarizing direction parallel to the X direction).

Since the liquid crystal layer 206 in the first polarizer modulator 200 is in the non-twisted arrangement state, the light beam L1 maintains the first polarizing direction (such as the polarizing direction parallel to the X direction) after passing through the first polarizer modulator 200.

Since the polarization material 310 of the second polarizer modulator 300 is in the twisted arrangement state, the light beam L2 which has the first polarizing direction is rotated into having a second polarizing direction (such as a polarizing direction parallel to the Y direction) after passing through the second polarizer modulator 300.

Since the birefringent material 308 has the alignment direction (X direction alignment) of the first direction, the light beam L2 which has the first polarizing direction is refracted after passing through the first lens structure 306 and birefringent material 308 of the second polarizer modulator 300 due to the difference between the refractive index of the first lens structure 306 and the second axial refractive index (ne) of the polymer molecules 308a of the birefringent material 308. In other words, the light beam L2 becomes a refracted light beam L3 after passing through the first lens structure 306 and the birefringent material 308.

The light beam L3 is rotated into having a second polarizing direction (such as the polarizing direction parallel to the Y direction) after passing through the polarization material 310.

The birefringent material 312 has the alignment direction (X direction alignment) of the first direction, and the refractive index of the second lens structure 314 is equivalent to the first axial refractive index (no) of the polymer molecules 312a of the birefringent material 312. Therefore, the light beam L3 which has the second polarizing direction is not refracted when passing through the birefringent material 312 and the second lens structure 314 of the second polarizer modulator 300. In other words, the light beam L3 passes through the birefringent material 312 and the second lens structure 314 in an original traveling direction thereof, and passes through the second polarizer modulator 300 in the original traveling direction, thereby becoming a refracted light beam L4 which has the second polarizing direction.

In the display mode shown in FIG. 3C, since the light beam L4 passes through the second polarizer modulator 300 as a refracted light beam, the image viewed by the viewer is a 3D image.

Second Embodiment

Figure 4:
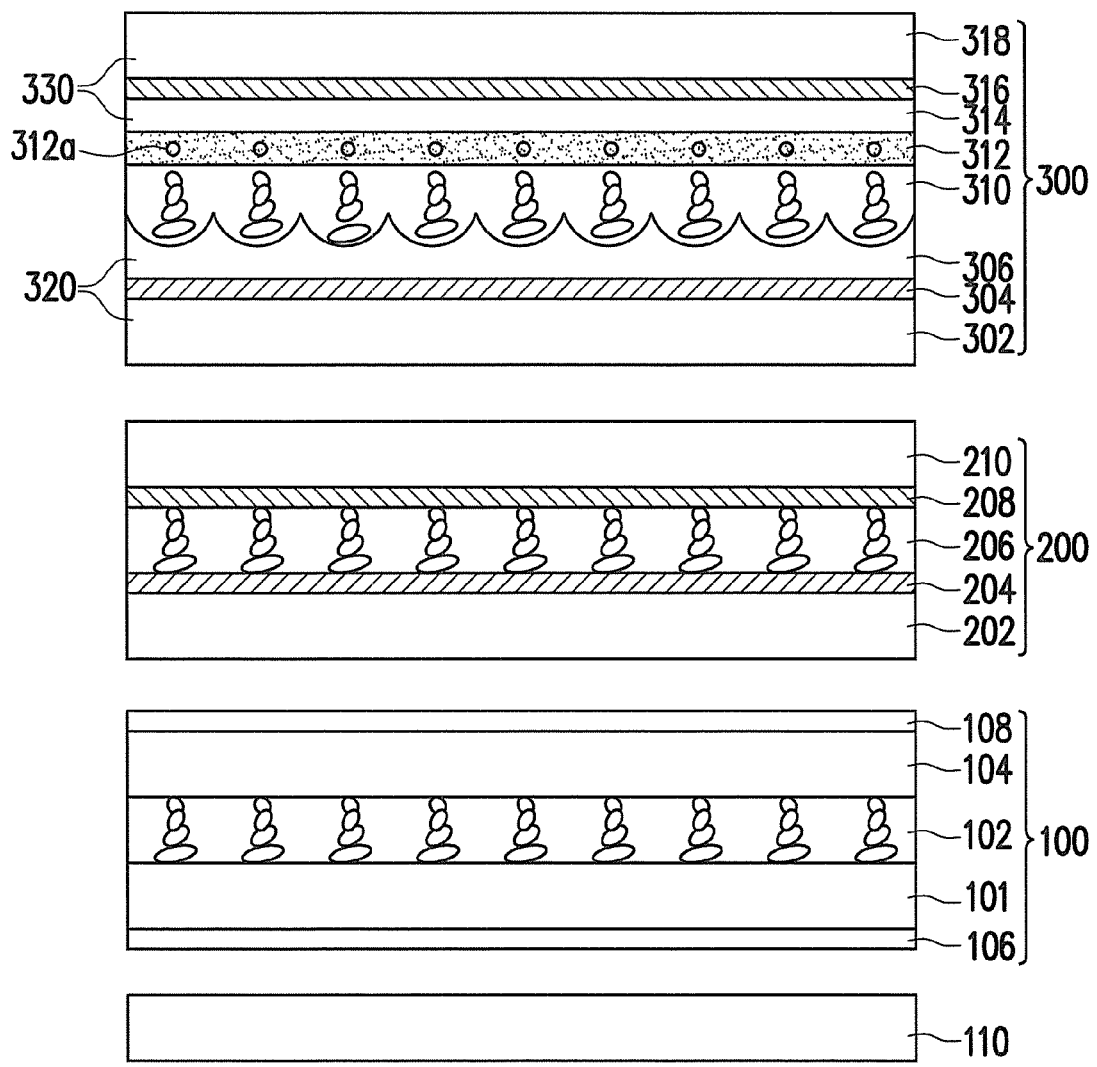
FIG. 4 is a schematic cross-sectional view of a stereo display according to another embodiment of the disclosure.

FIG. 4 is a schematic cross-sectional view of a stereo display according to another embodiment of the disclosure. The embodiment shown in FIG. 4 is similar to the embodiment shown in FIG. 1, so that elements similar to those in the embodiment shown in FIG. 1 are represented by the same reference numerals and are not repeatedly described. A difference between the embodiment shown in FIG. 4 and the embodiment shown in FIG. 1 is that no birefringent material is filled in the lens structure 306 of the second polarizer modulator 300; only the birefringent material 312 is filled in the second lens structure 314. In other words, in the first lens set 320, no birefringent material is filled in the columnar lens structures (columnar groove structures) of the first lens structure 306, so that the polarization material 310 directly contacts the first lens structure 306.

According to the present embodiment, since no birefringent material is filled in the first lens structure 306 of the second polarizer modulator 300, the polarization material 310 filled in the first lens structure 306 is a medium that determines whether a light beam is refracted when passing through the first lens structure 306. In other words, according to the present embodiment, the liquid crystal molecules in the polarization material 310 have the first axial refractive index (no) and the second axial refractive index (ne). In particular, the refractive index of the first lens structure 306 is equivalent to the first axial refractive index (no) of the polarization material 310.

According to another embodiment (not shown in the drawings) of the disclosure, it may alternatively be that no birefringent material is filled in the second lens structure of the second polarizer modulator; only the birefringent material is filled in the first lens structure. In other words, in the first lens set 320, no birefringent material is filled in the columnar lens structures (columnar groove structures) of the second lens structure. According to the present embodiment, the refractive index of the second lens structure is equivalent to the first axial refractive index (no) of the polarization material.

In other words, in the second polarizer modulator of the display according to the disclosure, the polymer material layer may be filled in the first lens set, the second lens set, or in both the first and second lens sets. Similarly, the following describes the image display method of the stereo display in FIG. 4.

2D Display Mode

Figure 5A:
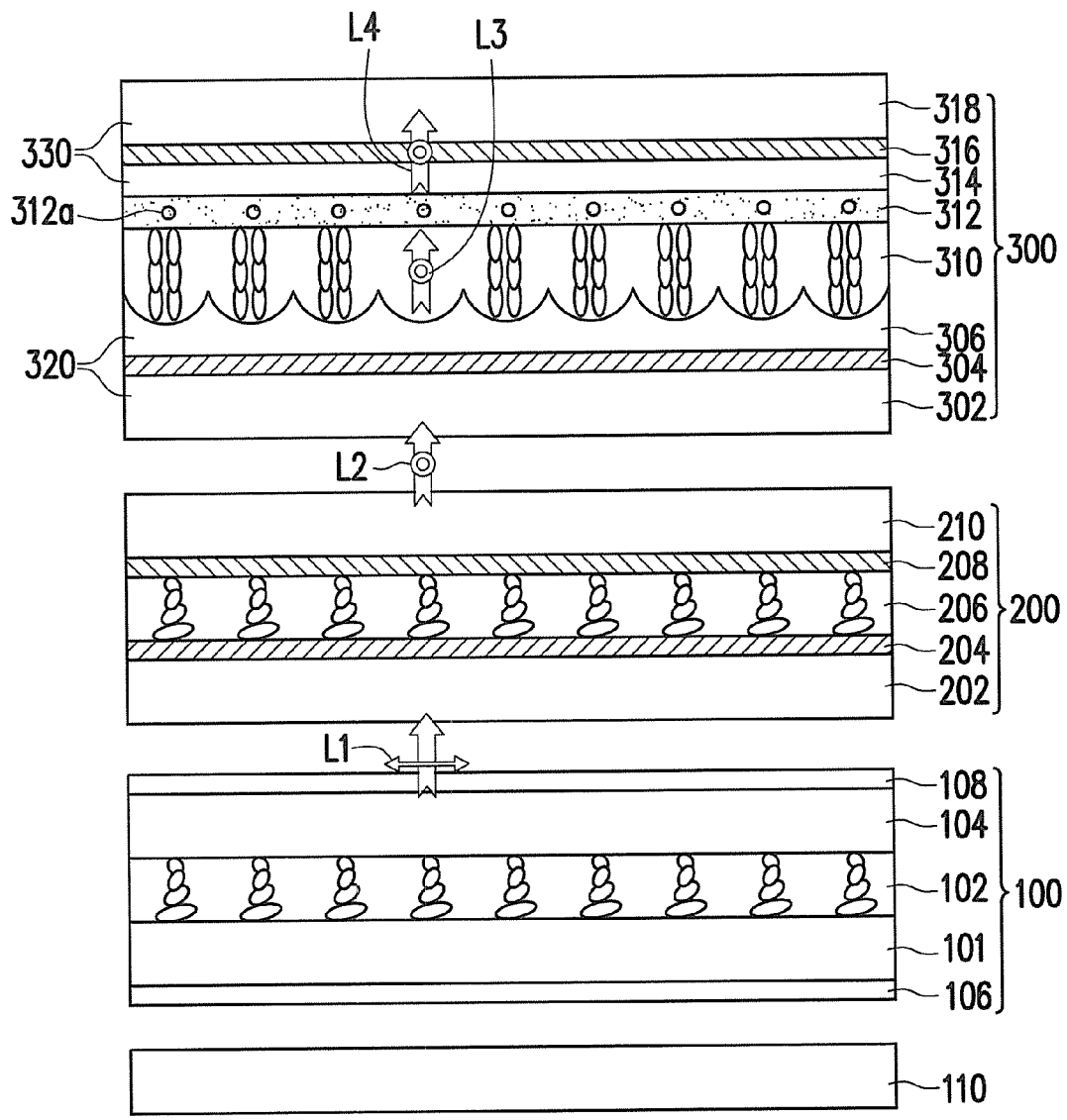
FIG. 5A is a schematic view of the stereo display in FIG. 4 in the 2D display mode.

FIG. 5A is a schematic view of the stereo display in FIG. 4 in a 2D display mode. Please refer to FIG. 5A. When a 2D image is to be displayed by the display, no voltage is applied to the first polarizer modulator 200, so that the liquid crystal layer 206 is maintained in a twisted arrangement state, and a voltage is applied to the second polarizer modulator 300, so that the polarization material 310 is in an non-twisted arrangement state.

The display panel 100 emits a light beam L1 which has a first polarizing direction (such as a polarizing direction parallel to the X direction).

Afterwards, since the liquid crystal layer 206 in the first polarizer modulator 200 is in a twisted arrangement state, the light beam L1 is rotated into a light beam L2 which has a second polarizing direction (such as a polarizing direction parallel to the Y direction) after passing through the first polarizer modulator 200.

Since the polarization material 310 of the second polarizer modulator 300 is in the non-twisted arrangement state, the light beam L2 which has the second polarizing direction still retains the second polarizing direction after passing through the second polarizer modulator 300.

In particular, since the first lens structure 306 has an alignment direction (extending towards the X direction) of the first direction, the polarization material 310 which is filled in the first lens structure 306 has the alignment direction (X direction alignment) of the first direction. In addition, the refractive index of the first lens structure 306 is equivalent to the first axial refractive index (no) of the polarization material 310. Therefore, the light beam L2 which has the second polarizing direction is not refracted when passing through the first lens structure 306 of the second polarizer modulator 300 and the polarization material 310 filled in the first lens structure 306. In other words, the light beam L2 directly passes through the first lens structure 306 to become a light beam L3 which has the second polarizing direction.

Since the polarization material 310 in the second polarizer modulator 300 is in the non-twisted arrangement state, the light beam L3 which has the second polarizing direction still retains the second polarizing direction after passing through the polarization material 310.

The birefringent material 312 has the alignment direction (X direction alignment) of the first direction, and the refractive index of the second lens structure 314 is equivalent to the first axial refractive index (no) of the polymer molecules 312a of the birefringent material 312. Therefore, the light beam L3 which has the second polarizing direction is not refracted when passing through the birefringent material 312 and the second lens structure 314 of the second polarizer modulator 300. In other words, the light beam L3 directly passes through the birefringent material 312 the second lens structure 314 to become a light beam L4 which directly passes through the second polarizer modulator 300.

In the display mode shown in FIG. 5A, since the light beam L4 directly passes through the second polarizer modulator 300 and is not refracted, the image viewed by the viewer is a 2D image.

3D Portrait Display Mode

Figure 5B:
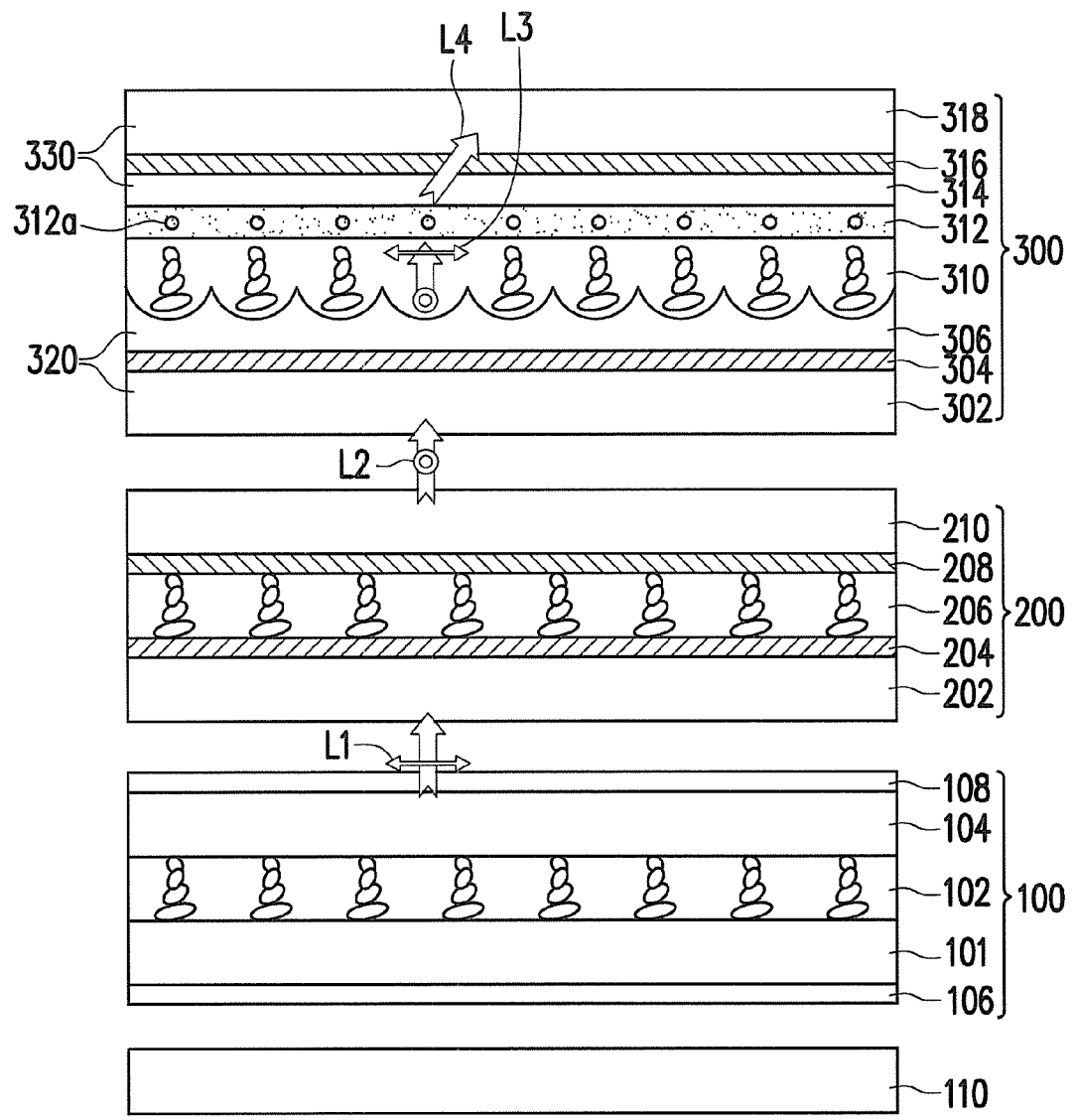
FIG. 5B is a schematic view of the stereo display in FIG. 4 in the 3D portrait display mode.

FIG. 5B is a schematic view of the stereo display in FIG. 4 in a 3D portrait display mode. Please refer to FIG. 5B. When a 3D image is to be displayed by the display in the 3D portrait display mode, no voltage is applied to the first polarizer modulator 200, so that the liquid crystal layer 206 is maintained in a twisted arrangement state, and no voltage is applied to the second polarizer modulator 300, so that the polarization material 310 is maintained in a twisted arrangement state.

Similarly, the display panel 100 emits a light beam L1 which has a first polarizing direction (such as a polarizing direction parallel to the X direction).

Since the liquid crystal layer 206 in the first polarizer modulator 200 is in the twisted arrangement state, the light beam L1 is rotated into a light beam L2 which has a second polarizing direction (such as a polarizing direction parallel to the Y direction) after passing through the first polarizer modulator 200.

Since the polarization material 310 in the second polarizer modulator 300 is also in the twisted arrangement state, the light beam L2 which has the second polarizing direction is rotated into having the first polarizing direction (such as the polarizing direction parallel to the X direction) after passing through the second polarizer modulator 300.

In particular, since the first lens structure 306 has an alignment direction (X direction alignment) of the first direction, the polarization material 310 which is filled in the first lens structure 306 has the alignment direction (X direction alignment) of the first direction. In addition, the refractive index of the first lens structure 306 is equivalent to the first axial refractive index (no) of the polarization material 310. Therefore, the light beam L2 which has the second polarizing direction is not refracted when passing through the first lens structure 306 of the second polarizer modulator 300 and the polarization material 310 in the first lens structure 306. In other words, the light beam L2 directly passes through the first lens structure 306 to become a light beam L3 which has the second polarizing direction.

The light beam L3 which has the second polarizing direction is rotated into having the first polarizing direction (such as the polarizing direction parallel to the X direction) when passing through the polarization material 310.

Since the birefringent material 312 has the alignment direction (X direction alignment) of the first direction, the light beam L3 which has the first polarizing direction is refracted when passing through the birefringent material 312 and the second lens structure 314 due to the difference between the second axial refractive index (ne) of the polymer molecules 312a of the birefringent material 312 and the refractive index of the second lens structure 314. In other words, after the light beam L3 passes through the birefringent material 312 and the second lens structure 314, the light beam L3 becomes a refracted light beam L4 which passes through the second polarizer modulator 300.

In the display mode shown in FIG. 5B, since the light beam L4 passes through the second polarizer modulator 300 as a refracted light beam, the image viewed by the viewer is a 3D image.

3D Landscape Display Mode

Figure 5C:
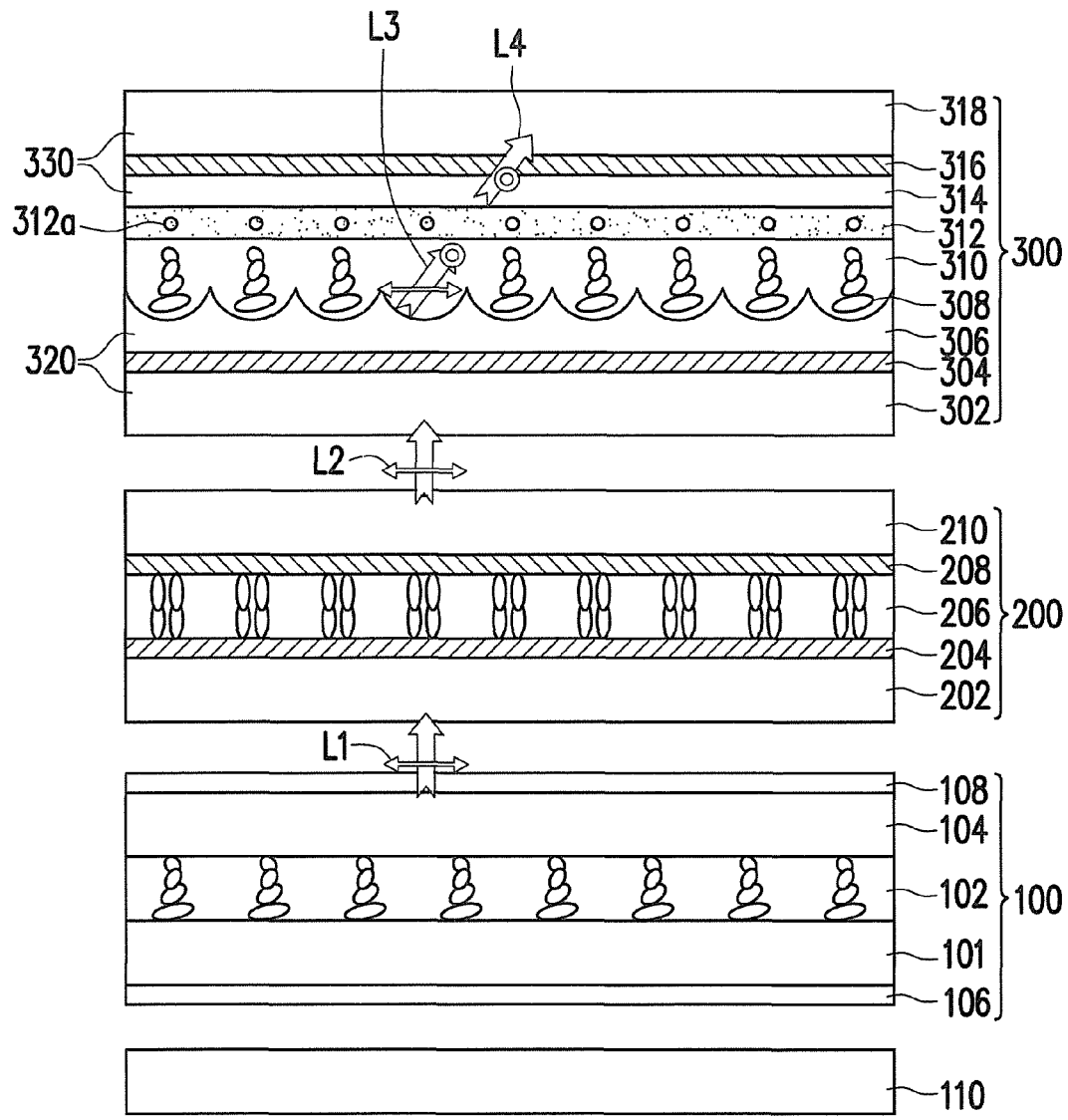
FIG. 5C is a schematic view of the stereo display in FIG. 4 in the 3D landscape display mode.

FIG. 5C is a schematic view of the stereo display in FIG. 4 in a 3D landscape display mode. Please refer to FIG. 5C. When a 3D image is to be displayed by the display in the 3D landscape display mode, a voltage is applied to the first polarizer modulator 200, so that the liquid crystal layer 206 is in an non-twisted arrangement state, and no voltage is applied to the second polarizer modulator 300, so that the polarization material 310 is maintained in a twisted arrangement state.

The display panel 100 emits a light beam L1 which has a first polarizing direction (such as a polarizing direction parallel to the X direction).

Since the liquid crystal layer 206 in the first polarizer modulator 200 is in the non-twisted arrangement state, the light beam L1 becomes a light beam L2 which has the first polarizing direction (such as the polarizing direction parallel to the X direction) after passing through the first polarizer modulator 200.

Since the polarization material 310 in the second polarizer modulator 300 is in the twisted arrangement state, the light beam L2 which has the first polarizing direction is rotated into having a second polarizing direction (such as a polarizing direction parallel to the Y direction) after passing through the second polarizer modulator 300.

In particular, since the first lens structure 306 has an alignment direction (X direction alignment) of the first direction, the polarization material 310 which is filled in the first lens structure 306 also has the alignment direction (X direction alignment) of the first direction. Therefore, the light beam L2 which has the first polarizing direction is refracted when passing through the first lens structure 306 of the second polarizer modulator 300 due to the difference between the refractive index of the first lens structure 306 and the second axial refractive index (ne) of the polymer molecules of the polarization material 310. In other words, the light beam L2 becomes a refracted light beam L3 after passing through the first lens structure 306 and the polarization material 310 of the first lens structure 306.

The light beam L3 is rotated into having the second polarizing direction (such as the polarizing direction parallel to the Y direction) after passing through the polarization material 310.

The birefringent material 312 has the alignment direction (X direction alignment) of the first direction, and the refractive index of the second lens structure 314 is equivalent to the first axial refractive index (no) of the polymer molecules 312a of the birefringent material 312. Therefore, the light beam L3 which has the second polarizing direction is not refracted when passing through the birefringent material 312 and the second lens structure 314 of the second polarizer modulator 300. In other words, the light beam L3 passes through the birefringent material 312 and the second lens structure 314 in an original traveling direction thereof, and passes through the second polarizer modulator 300 in the original traveling direction, thereby becoming a refracted light beam L4 which has the second polarizing direction.

In the display mode shown in FIG. 5C, since the light beam L4 passes through the second polarizer modulator 300 as a refracted light beam, the image viewed by the viewer is a 3D image.

Figure 6:
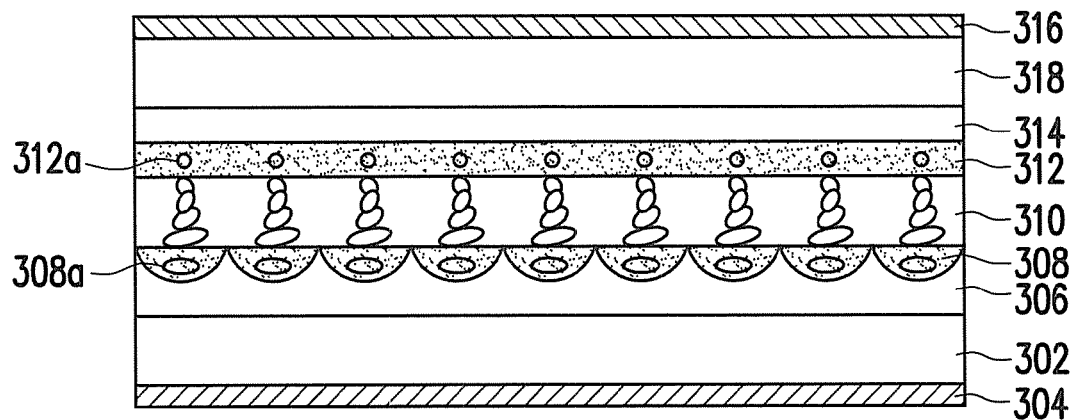
FIG. 6 is a schematic cross-sectional view of a second polarizer modulator in a stereo display according to an embodiment of the disclosure.
Figure 7:
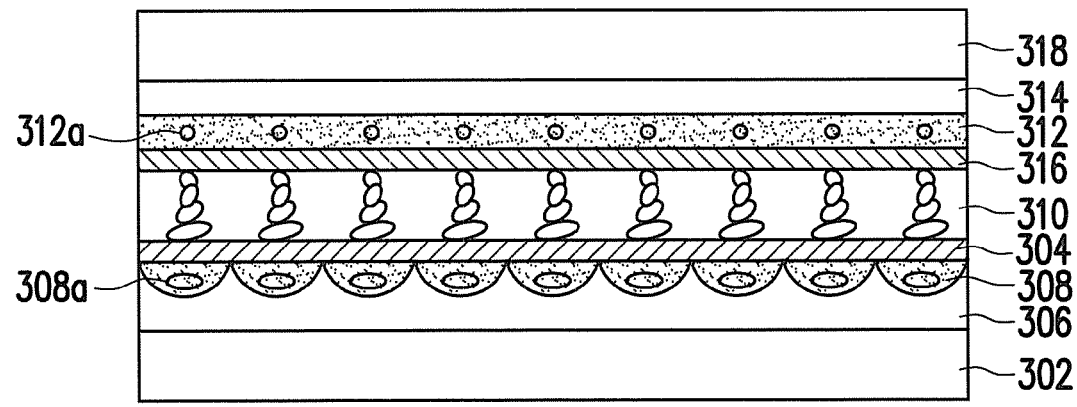
FIG. 7 is a schematic cross-sectional view of a second polarizer modulator in a stereo display according to another embodiment of the disclosure.

According to the above embodiments, the upper electrode 316 in the second polarizer modulator 300 is disposed between the second supporting substrate 318 and the second lens structure 314, and the lower electrode 304 is disposed between the first supporting substrate 302 and the first lens structure 306. However, the disclosure is not limited to this configuration. According to another embodiment shown in FIG. 6, the lower electrode 304 may be disposed on an outer surface of the first supporting substrate 302, and the upper electrode 316 may be disposed on an outer surface of the second supporting substrate 318. Moreover, as shown in FIG. 7, the lower electrode 304 may be disposed between the first lens structure 306 and the polarization material 310, and the upper electrode 316 may be disposed between the second lens structure 314 and the polarization material 310.

In summary, the stereo display according to the disclosure utilizes the first polarizer modulator and the second polarizer modulator in conjunction, and the birefringent material is disposed in the lens set of the second polarizer modulator. Through the above arrangement, the display is capable of displaying in the 2D display mode, the 3D portrait display mode, and the 3D landscape display mode.

It will be apparent to those skilled in the art that various modifications and variations can be made to the disclosure without departing from the scope or spirit of the disclosure. In view of the foregoing, it is intended that the disclosure cover modifications and variations of this disclosure provided they fall within the scope of the following claims and their equivalents.

What is claimed is:

1. An image display method for a stereo display, comprising:
   providing a stereo display comprising:
      a display panel;
      a first polarizer modulator, disposed above the display panel; and a second polarizer modulator, disposed above the first polarizer modulator, wherein the second polarizer modulator comprises:
a first lens set;
a second lens set, wherein an angle is included between an extending direction of the first lens set and an extending direction of the second lens set, and the angle is not equivalent to 0 or 180 degrees;
a polarization material disposed between the first lens set and the second lens set; and
a first birefringent material, filled in the first lens set;
when a 2D image is to be displayed, rotating a light beam from the display panel having a first polarizing direction into a light beam having a second polarizing direction after passing through the first polarizer modulator, and making the light beam having the second polarizing direction retain the second polarizing direction after passing through the second polarizer modulator, wherein the light beam having the second polarizing direction is not substantially refracted when passing through the birefringent material of the second polarizer modulator, so as to display the 2D image;
when an image in a 3D portrait display mode is to be displayed, rotating the light beam emitted by the display panel and having the first polarizing direction into the light beam having the second polarizing direction after passing through the first polarizer modulator, and rotating the light beam having the second polarizing direction into the light beam having the first polarizing direction after passing through the second polarizer modulator, wherein the light beam having the first polarizing direction is refracted when passing through the birefringent material of the second polarizer modulator, so as to display the image in the 3D portrait display mode; and
when an image in a 3D landscape display mode is to be displayed, making the light beam emitted by the display panel and having the first polarizing direction substantially retain the first polarizing direction after passing through the first polarizer modulator, and rotating the light beam having the first polarizing direction into the light beam having the second polarizing direction after passing through the second polarizer modulator, wherein the light beam having the second polarizing direction is refracted when passing through the birefringent material of the second polarizer modulator, so as to display the image in the 3D landscape display mode.

2. The method as claimed in claim 1, wherein when the 2D image is to be displayed, no voltage is applied to the first polarizer modulator, so that the liquid crystal layer is substantially in a twisted arrangement state, and a voltage is applied to the second polarizer modulator, so that the polarization material is substantially in an non-twisted arrangement state, and wherein when the image in the 3D portrait display mode is to be displayed, no voltage is applied to the first polarizer modulator, so that the liquid crystal layer is substantially in a twisted arrangement state, and no voltage is applied to the second polarizer modulator, so that the polarization material is substantially in the twisted arrangement state.

3. The method as claimed in claim 1, wherein when the 2D image is to be displayed, no voltage is applied to the first polarizer modulator, so that the liquid crystal layer is substantially in a twisted arrangement state, and a voltage is applied to the second polarizer modulator, so that the polarization material is substantially in an non-twisted arrangement state, and wherein when the image in the 3D landscape display mode is to be displayed, a voltage is applied to the first polarizer modulator, so that the liquid crystal layer is substantially in an non-twisted arrangement state, and no voltage is applied to the second polarizer modulator, so that the polarization material is substantially in a twisted arrangement state.

4. The method as claimed in claim 1, wherein the second polarizer modulator further comprises a second birefringent material filled in the second lens set.

5. The method as claimed in claim 1, wherein the stereo display further comprises an upper electrode and a lower electrode, respectively disposed on the first lens set and the second lens set.

6. The method as claimed in claim 5, wherein each of the upper electrode and the lower electrode of the second polarizer modulator is an unpatterned electrode layer.

7. The method as claimed in claim 5, wherein the upper electrode has an upper electrode pattern, and the lower electrode has a lower electrode pattern.

8. The method as claimed in claim 5, wherein:
the first lens set comprises:
a first supporting substrate; and
a first lens structure disposed on the first supporting substrate, wherein the first lens structure have a plurality of groove structures, wherein each of the groove structures of the first lens structure has a concave; and
the second lens set comprises:
a second supporting substrate; and
a second lens structure disposed on the second supporting substrate, wherein the second lens structure have a plurality of groove structures, wherein each of the groove structures of the second lens structure has a concave.

9. The method as claimed in claim 8, wherein a material of the first lens structure and the second lens structure comprises ultraviolet light-curing resin.

10. The method as claimed in claim 8, wherein the lower electrode is disposed on an outer surface of the first supporting substrate, is disposed between the first supporting substrate and the first lens structure, or is disposed between the first lens structure and the polarization material.

11. The method as claimed in claim 8, wherein the upper electrode is disposed on an outer surface of the second supporting substrate, is disposed between the second supporting substrate and the second lens structure, or is disposed between the second lens structure and the polarization material.

12. The method as claimed in claim 8, wherein each of the first lens structure and the second lens structure comprises a plurality of columnar lens structures.

13. The method as claimed in claim 1, wherein the first polarizer modulator comprises:
a first substrate, wherein a first electrode is disposed on the first substrate;
a second substrate, wherein a second electrode is disposed on the second substrate; and
a liquid crystal layer, disposed between the first substrate and the second substrate.

14. The method as claimed in claim 13, wherein each of the first electrode and the second electrode is an unpatterned electrode layer.

15. The method as claimed in claim 13, wherein the first electrode has a first electrode pattern, and the second electrode has a second electrode pattern.

16. The method as claimed in claim 13, wherein the display panel comprises:
a pixel array substrate;

an opposite substrate;
a display medium, disposed between the pixel array substrate and the opposite substrate; and
at least one polarizer, disposed on at least one of the pixel array substrate and the opposite substrate.

17. An image display method for a stereo display, comprising:
providing a stereo display comprising:
a display panel, wherein the display panel comprises:
a pixel array substrate;
an opposite substrate;
a display medium, disposed between the pixel array substrate and the opposite substrate; and
at least one polarizer, disposed on at least one of the pixel array substrate and the opposite substrate;
a first polarizer modulator, disposed above the display panel, wherein the first polarizer modulator comprises:
a first substrate, wherein a first electrode is disposed on the first substrate;
a second substrate, wherein a second electrode is disposed on the second substrate; and
a liquid crystal layer, disposed between the first substrate and the second substrate; and
a second polarizer modulator, disposed above the first polarizer modulator, wherein the second polarizer modulator comprises:
a first lens set comprising:
a first supporting substrate; and
a first lens structure disposed on the first supporting substrate, wherein the first lens structure have a plurality of groove structures, wherein each of the groove structures of the first lens structure has a concave;
a first birefringent material, completely filled within the groove structures of the first lens structure;
a second lens set comprising:
a second supporting substrate; and
a second lens structure disposed on the second supporting substrate, wherein the second lens structure have a plurality of groove structures, wherein each of the groove structures of the second lens structure has a concave, wherein an angle is included between an extending direction of the first lens set and an extending direction of the second lens set, and the angle is not equivalent to 0 or 180 degrees;
a second birefringent material, completely filled within the groove structures of the second lens structure; and
a polarization material disposed between the first birefringent material and the second birefringent material, wherein the polarization material is not in the groove structures of the first lens structure and the groove structures of the second lens structure, wherein the concave of each of the groove structures of the first lens structure faces toward the second lens set and the polarization material, and wherein the concave of each of the groove structures of the first lens structure faces toward the concave of each of the groove structures of the second lens structure;
when a 2D image is to be displayed, rotating a light beam from the display panel having a first polarizing direction into a light beam having a second polarizing direction after passing through the first polarizer modulator, and making the light beam having the second polarizing direction retain the second polarizing direction after passing through the second polarizer modulator, wherein the light beam having the second polarizing direction is not substantially refracted when passing through the birefringent material of the second polarizer modulator, so as to display the 2D image;
when an image in a 3D portrait display mode is to be displayed, rotating the light beam emitted by the display panel and having the first polarizing direction into the light beam having the second polarizing direction after passing through the first polarizer modulator, and rotating the light beam having the second polarizing direction into the light beam having the first polarizing direction after passing through the second polarizer modulator, wherein the light beam having the first polarizing direction is refracted when passing through the birefringent material of the second polarizer modulator, so as to display the image in the 3D portrait display mode; and
when an image in a 3D landscape display mode is to be displayed, making the light beam emitted by the display panel and having the first polarizing direction substantially retain the first polarizing direction after passing through the first polarizer modulator, and rotating the light beam having the first polarizing direction into the light beam having the second polarizing direction after passing through the second polarizer modulator, wherein the light beam having the second polarizing direction is refracted when passing through the birefringent material of the second polarizer modulator, so as to display the image in the 3D landscape display mode.

* * * * *